United States Patent
Yu et al.

(10) Patent No.: US 11,978,331 B2
(45) Date of Patent: May 7, 2024

(54) EARLY WARNING METHOD FOR SHALLOW SOIL LANDSLIDE BASED ON DIGITAL TOPOGRAPHIC MAP AND APPLICATION THEREOF

(71) Applicants: Chengdu University of Technology, Chengdu (CN); Guizhou Geological Environment Monitoring Institute (Guizhou Institute of Environmental Geology), Guiyang (CN)

(72) Inventors: Bin Yu, Chengdu (CN); Yangchun Li, Guiyang (CN); Weiwei Deng, Guiyang (CN); Lingwei Yang, Chengdu (CN); Wenhong Chen, Chengdu (CN)

( * ) Notice: Subject to any disclaimer, the term of this patent is extended or adjusted under 35 U.S.C. 154(b) by 77 days.

(21) Appl. No.: 18/058,853

(22) Filed: Nov. 25, 2022

(65) Prior Publication Data
US 2023/0169842 A1    Jun. 1, 2023

(30) Foreign Application Priority Data
Nov. 26, 2021 (CN) .......................... 202111420952.5

(51) Int. Cl.
*G08B 21/10* (2006.01)
*G08B 31/00* (2006.01)

(52) U.S. Cl.
CPC .............. *G08B 21/10* (2013.01); *G08B 31/00* (2013.01)

(58) Field of Classification Search
CPC ........ G08B 21/10; G08B 31/00; G01V 1/008; G06F 17/18
See application file for complete search history.

(56) References Cited

FOREIGN PATENT DOCUMENTS

CN    209168369 U    *    7/2019
CN    111967544 A    *    11/2020

OTHER PUBLICATIONS

Office Action of CN202111420952.5, dated Jun. 10, 2022.
Notice of Grant of CN202111420952.5,, dated Aug. 26, 2022.

* cited by examiner

*Primary Examiner* — An T Nguyen
(74) *Attorney, Agent, or Firm* — Zhigang Ma

(57) ABSTRACT

This is an early warning method for a shallow soil landslide based on a digital topographic map, belonging to the field of landslide prevention and control engineering. It has following steps: a. connecting a straight line along an upward bulged intermediate point of a contour line of the topographic map as an intermediate line; b. determining an intermediate point; c. constituting a three-point group of a plane curvature; d. taking an arithmetic average of slopes as a slope α of a landslide mass. The shallow soil landslide can be early warned without a lot of historical observation data of landslide occurrence, and the dangerous landslide mass can be determined in advance, which greatly improves the applicability of disaster prevention and the early warning efficiency.

7 Claims, No Drawings

EARLY WARNING METHOD FOR SHALLOW SOIL LANDSLIDE BASED ON DIGITAL TOPOGRAPHIC MAP AND APPLICATION THEREOF

CROSS-REFERENCE TO RELATED APPLICATIONS

This application claims the benefit and priority of Chinese Patent Application Number 202111420952.5, filed on Nov 26, 2021 with China National Intellectual Property Administration, the disclosures of which are incorporated herein by reference in their entireties.

BACKGROUND OF THE PRESENT INVENTION

Field of the Invention

The present invention relates to the technical field of landslide prevention and control engineering, in particular to an early warning method for a shallow soil landslide based on a digital topographic map and application thereof.

Description of Related Arts

Shallow soil landslides are a natural phenomenon occurring in mountainous areas. The occurrence of shallow soil landslides often requires three conditions: first, topographic conditions conducive to the occurrence of shallow soil landslides; second, sufficient soil sources, i.e., loose soil covering layers; and third, abundant rainfall enters the soil. These conditions comprehensively affect and determine the stability of slope soil. Among them, the influence factors of topographic conditions on a shallow soil landslide include: slope gradient of a potential landslide mass, cross-sectional depression of the landslide mass, gentle slope topography on the upper side of the landslide mass and free face topography on the lower side.

At present, the studies of scholars at home and abroad mainly focus on slope gradient, and also use cross-sectional depression and vertical-sectional uplift topography for quantitative description mainly by field measurement, which is not conducive to the early warning of large-scale shallow soil landslides. If the susceptibilities of landslides are determined by means of digital topographic maps through slopes, plane curvatures and profile curvatures, because the scales of landslide masses are not accurately determined, the results of calculating different scales of landslides with a unified DEM scale have great errors in the slopes, plane curvatures and profile curvatures of the landslides.

Chinese patent No. CN104299367A published on Jan. 21, 2015 discloses a multi-level comprehensive monitoring and early warning method for landslide disasters, which is characterized by comprising the following steps: (1) calculating a critical threshold of landslide monitoring and early warning through historical recorded monitoring data and landslide deformation and failure model test; determining, according to a critical index of each indicator, whether there is a possibility of landslide in a study area; (2) if the monitoring value is greater than the critical value, determining a possible place and possibility of landslide occurrence according to each landslide occurrence index, and delimiting an early warning level; (3) determining four-level early warning and an early warning boundary area; and (4) releasing the early warning results, and directly notifying a monitoring responsible person in combination with a network system of group monitoring and prevention in the early warning area, so as to prepare for disaster prevention and avoidance.

The multi-level comprehensive monitoring and early warning method for landslide disasters disclosed in the patent document needs a lot of historical recorded monitoring data of landslide occurrence, then calculates the critical threshold of landslide monitoring and early warning through landslide deformation and failure model test, and determines, according to the critical index of each indicator, whether there is the possibility of landslide in the study area, so many landslide factors need to be analyzed, the whole early warning work is complex, the response lags, the early warning efficiency is low, and the applicability of disaster prevention is poor.

SUMMARY OF THE PRESENT INVENTION

In order to overcome the above defects of the prior art, the present invention provides an early warning method for a shallow soil landslide based on a digital topographic map and application thereof. By comprehensively considering the relationship between DEM scales and landslide scales, the influence factors of slope and cross-sectional depression of a landslide mass and an action mechanism in the landslide, an early warning calculation model for a shallow soil landslide based on a digital topographic map is built, so that the shallow soil landslide can be accurately determined and identified in a quantitative way, the shallow soil landslide can be early warned without a lot of historical observation data of landslide occurrence, and the dangerous landslide mass can be determined in advance, which greatly improves the applicability of disaster prevention and the early warning efficiency.

The present invention is implemented by the following technical solution:

An early warning method for a shallow soil landslide based on a digital topographic map is characterized by comprising the following steps:

a. Determining a slope with a depressed cross section through topographic DEM data according to contour lines of the topographic map, then determining boundaries of both sides outside the landslide from straight segments or downward bulged segments on both sides, and connecting a straight line at an intermediate position of a landslide mass perpendicular to a bottom boundary upward along an upward bulged intermediate point of each contour line of the topographic map as an intermediate line;

b. Determining an intermediate point on the intermediate line of the intermediate position of each grid line from the bottom intermediate line up, the spacing between the intermediate points being a DEM point spacing;

c. Drawing a bottom parallel line perpendicular to the intermediate line across the intermediate point to intersect the outer boundary of the landslide, the intersection points of two boundaries being outer boundary points, which together with the intermediate point on the same line constitute a three-point group of a plane curvature Qp of a potential landslide mass intermediate point;

d. Calculating a slope of each intermediate point by arcgis according to the position of each intermediate point and grid data, and finally, taking an arithmetic average of the slopes of all the intermediate points as a slope a of the landslide mass;

e. Assigning, according to the distribution principle of topographic DEM data, all points in each grid with the same values, including coordinates and elevation, which are obtained through the grid;

f. Calculating a plane curvature Qp of each potential landslide mass intermediate point through a three-point method according to Formula 1, and then taking an arithmetic average to obtain a plane curvature Q of a potential landslide mass;

$$Qp = 2\sin A/a \quad \text{Formula 1}$$

$$A = \arccos[(b^2+c^2-a^2)/(2bc)] \quad \text{Formula 2}$$

$$a = \sqrt{(x_1-x_2)^2+(y_1-y_2)^2} \quad \text{Formula 3}$$

$$b = \sqrt{(x_1-x_3)^2+(y_1-y_3)^2} \quad \text{Formula 4}$$

$$c = \sqrt{(x_3-x_2)^2+(y_3-y_2)^2} \quad \text{Formula 5}$$

Where Qp is the plane curvature of the potential landslide mass intermediate point, $x_1$, $x_2$ and $x_3$ are projected X coordinates of the first group of points 1, 2 and 3 in turn, $x_1=0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are the elevations of points 1, 2 and 3 respectively;

$$x_2 = \sqrt{(Xa-Xb)^2+(Ya-Yb)^2} \quad \text{Formula 6}$$

$$\sqrt{x_3 = (Xa-Xc)^2+(Ya-Yc)^2} \quad \text{Formula 7}$$

Where Xa and Ya are X and Y coordinates of point 1 in turn; Xb and Yb are X and Y coordinates of point 2 in turn; Xc and Yc are X and Y coordinates of point 3 in turn;

The plane curvatures Qp of the second to fifth groups of potential landslide mass intermediate points are calculated by Formula 1;

g. Calculating a topographic factor T of the potential landslide mass according to Formula 8;

$$T = \tan\alpha - 5Q \quad \text{Formula 8}$$

Where T is the topographic factor of the potential landslide mass, a is the slope of the landslide mass, and Q is the plane curvature of the potential landslide mass;

h. Calculating a rainfall factor R according to Formula 9;

$$R = (I/I_0)(D/D_0)^{0.82} \quad \text{Formula 9}$$

Where R is the rainfall factor, I is a hourly rainfall intensity, $I_0$ is an average value of years of local maximum annual hourly rainfalls and is determined by inquiring the local hydrological manual, D is a rainfall duration, and $D_0$ is a unit rainfall time, which is 1 hour;

i. Calculating an early warning determination value P of the shallow soil landslide according to Formula 10;

$$P = RT \quad \text{Formula 10}$$

Where P is the early warning determination value of the shallow soil landslide, R is the rainfall factor, and T is the topographic factor of the potential landslide mass;

j. Performing early warning according to the early warning determination value P of the shallow soil landslide, wherein when P<2.5, the possibility of landslide occurrence is low; when 2.5≤P<3.8, the possibility of landslide occurrence is medium; when P>3.8, the possibility of landslide occurrence is high.

In step f, taking the arithmetic average refers to calculating a positive or negative sign of the plane curvature Qp of the potential landslide mass intermediate point first according to Formula 11 and Formula 12;

$$\text{If } y_2-kx_2-y_1>0 \quad \text{Formula 11}$$

The plane curvature Qp of the potential landslide mass intermediate point is positive, indicating a bulged topography;

$$\text{If } y_2-kx_2-y_1<0 \quad \text{Formula 12}$$

The plane curvature Qp of the potential landslide mass intermediate point is negative, indicating a depressed topography;

Where k is a coefficient, calculated by Formula 13;

$$k = (y_3-y_1)/x_3 \quad \text{Formula 13}$$

Then bringing the calculated positive or negative sign of the plane curvature Qp of the potential landslide mass intermediate point into the plane curvature Qp of the potential landslide mass intermediate point, and finally, performing arithmetic averaging on the plane curvatures Qp of all groups of potential landslide mass intermediate points.

In step a, the slope with a depressed cross section indicates that the contour lines of the topographic map are bulged upward when viewed from the bottom.

In step a, the boundary refers to a downward bulged vertex or a starting position of a straight segment.

In step c, the same line refers to the bottom parallel line.

The present invention is applicable to the early warning of a shallow soil landslide with a slope of 15≤α≤50°.

The present invention is applicable to the early warning of a shallow soil landslide with a depressed or straight slope cross section.

The present invention is applicable to the early warning of a shallow soil landslide with a thickness of 2-10 m.

The arcgis described in the present invention refers to geographic information system software.

The DEM described in the present invention is index value elevation data.

The basic principle of the present invention is as follows:

Slope is the most important factor affecting the occurrence of a landslide. The magnitude of the slope not only affects the accumulation and distribution of loose clastic matters, but also affects the confluence condition of a slope surface. Most shallow soil landslides occur at the slope of 15-50°. If the slope is too gentle, the landslide is underpowered and cannot occur. If the slope is too steep, the soil layer cannot gather enough thickness on the slope surface, and no landslide occurs. The cross-sectional depressed topography is favorable for rainwater to flow into the landslide mass and infiltrate into the shallow landslide mass, which leads to gradual saturation and softening of soil, gradual decrease of matrix suction and shear strength, further decrease of soil strength, and finally, slide along a sliding zone because the shear strength of a shear plane is lower than the shear stress. Therefore, the landslide slope and the cross-sectional depressed topography play their roles in a landslide, and especially the cross-sectional depressed topography determines the catchment condition. The applicability of disaster prevention is greatly improved by comprehensively considering topographic influence factors of the shallow soil landslide, determining a landslide possibility quantitatively, and early warning the potential landslide mass.

The above landslide mechanism can also be realized by field investigation, but the field investigation has huge workload and extremely low efficiency. If the early warning of the shallow soil landslide under the above mechanism is realized by DEM, it can be realized without field work, which greatly improves the efficiency and screens a large number of potential shallow soil landslides.

The beneficial effects of the present invention are mainly shown in the following aspects:

1. In the present invention, by comprehensively considering the relationship between DEM scales and landslide scales, the influence factors of slope and cross-sectional depression of a landslide mass and an action mechanism in the landslide, an early warning calculation model for a shallow soil landslide based on a digital topographic map is built, so that the shallow soil landslide can be accurately determined and identified in a quantitative way, the shallow soil landslide can be early warned without a lot of historical observation data of landslide occurrence, and the dangerous landslide mass can be determined in advance, which greatly improves the applicability of disaster prevention and the early warning efficiency.

2. In the present invention, the plane curvature of a potential landslide mass is calculated not only by DEM data and a unified default method, but also by a three-point method, which avoids huge errors caused by DEM data intervals and landslide scale differences. The conventional default method calculates the plane curvature of a potential landslide mass by means of a specific DEM point, as well as 8 points in upper (1), lower (1), left (1), right (1) and oblique directions (4), totaling 9 points, where the calculated plane curvature is related to the grid scale and range where the 9 points are located. However, if the scale of the potential landslide mass is quite different from the grid scale of this DEM, the plane curvature cannot reflect the plane curvature of the potential landslide mass; if the scale of the potential landslide mass is much larger than the grid scale of the DEM, for example, the width of the landslide mass is 50 in and the DEM is 20 in, the calculated plane curvature is a part of the plane curvature of the potential landslide mass, and even if multiple plane curvatures on the landslide mass are averaged, it cannot represent the depressed or bulged characteristics of the whole potential landslide mass; if the scale of the potential landslide mass is much smaller than the grid scale of the DEM, for example, the width of the landslide mass is 5 in and the DEM is 20 in, the calculated plane curvature is a plane curvature in an area outside the outer boundary of the potential landslide mass, and cannot represent the depressed or bulged characteristics of the whole potential landslide mass. The present invention overcomes the conventional curvature calculation problems by organically combining a three-point method, and the calculated plane curvature can reflect the true depressed or bulged characteristics of the potential landslide mass.

3. The present invention adopts the three-point method to calculate the plane curvature of the potential landslide mass, so that the calculated plane curvature is more in line with the actual plane curvature of the landslide mass, and the calculation result is more accurate and reasonable, thus making the early warning of the potential landslide mass more accurate.

4. In the present invention, the range of a potential landslide mass is determined by means of DEM topographic data and the contour lines of a topographic map, and important DEM points and each group of data points are determined within this range. According to each group of data points with three points on one line as a group, the slope a of the landslide mass and the plane curvature $Q_p$ of each potential landslide mass intermediate point are calculated; then the topographic factor T of the landslide mass is calculated; finally, the shallow soil landslide is early warned according to the slope a of the landslide mass, the plane curvature $Q_p$ of each potential landslide mass intermediate point and the topographic factor T; the degree of landslide occurrence is studied from the internal mechanism by means of topographic factors, and the slope and cross-sectional topographic conditions of the landslide mass are completely combined to comprehensively consider the effect of topographic factors and reflect the mutual relation and importance of various influence factors; T, $\tan(\alpha)$ and Q are all dimensionless parameters and can be used under various shallow soil landslide conditions, which greatly improves the applicability of disaster prevention.

5. In the present invention, when P<2.5, the possibility of landslide occurrence is low; when 2.5≤P<3.8, the possibility of landslide occurrence is medium; when P≥3.8, the possibility of landslide occurrence is high. Only under enough terrain conditions and rainfall conditions, the early warning determination value P of the shallow soil landslide can early warn the occurrence of a landslide. In addition, the greater the P value is, the higher the possibility of landslide occurrence is; otherwise, the smaller the P value is, the lower the possibility of landslide occurrence is. The early warning of a landslide is intuitive and clear, which is more conducive to improving the applicability of disaster prevention.

6. The present invention is applicable to the early warning of a shallow soil landslide with a slope of 15≤α≤50°. The magnitude of the slope not only affects the accumulation and distribution of loose clastic matters, but also affects the confluence condition of a slope surface. If the slope is too gentle, the landslide is underpowered; if the slope is too steep, the soil layer cannot gather enough thickness on the slope surface; and when the slope of the landslide mass is 15≤α≤50°, the early warning accuracy of the shallow soil landslide is high, and prevention and control measures can be taken in time.

7. The present invention is applicable to the early warning of a shallow soil landslide with a depressed or straight slope cross section. When the cross section is bulged, the water flow disperses to both sides and does not seep into the landslide mass, so a landslide will not be formed; and when the cross section of the slope is depressed or straight, especially the depressed topography, rainfall can be collected, which is more conducive to the occurrence of a landslide. When the cross section of the slope is depressed or straight, the early warning accuracy of the shallow soil landslide is extremely high, and the applicability for disaster prevention is strong.

8. The present invention is applicable to the early warning of a shallow soil landslide with a thickness of 2-10 m. When the soil layer is too thin, the water body is likely to enter the landslide mass and reach the sliding surface, so the effect and influence of depressions and bulges in the cross section are greater, the resistance on both sides is smaller, and the depressions have a greater influence under the comprehensive action. When the soil layer is too thick, the water body is unlikely to enter the landslide mass and reach the sliding surface, so the effect and influence of depressions and bulges in the cross section are smaller, the resistance on both sides is greater, and the depressions have a smaller influence under the comprehensive action. The cross section is affected by the depressed topography, which differs due to the different thicknesses of the soil layer. Therefore, the present invention has extremely high early warning accuracy for a shallow soil landslide and strong applicability for disaster prevention.

DETAILED DESCRIPTION OF THE PREFERRED EMBODIMENT

Embodiment 1

An early warning method for a shallow soil landslide based on a digital topographic map includes the following steps:

a. A slope with a depressed cross section is determined through topographic DEM data according to contour lines of the topographic map, then boundaries of both sides outside the landslide are determined from straight segments or downward bulged segments on both sides, and a straight line is connected at an intermediate position of a landslide mass perpendicular to a bottom boundary upward along an upward bulged intermediate point of each contour line of the topographic map as an intermediate line;

b. An intermediate point is determined on the intermediate line of the intermediate position of each grid line from the bottom intermediate line up, the spacing between the intermediate points being a DEM point spacing;

c. A bottom parallel line is drawn perpendicular to the intermediate line across the intermediate point to intersect the outer boundary of the landslide, the intersection points of two boundaries being outer boundary points, which together with the intermediate point on the same line constitute a three-point group of a plane curvature Qp of a potential landslide mass intermediate point;

d. A slope of each intermediate point is calculated by arcgis according to the position of each intermediate point and grid data, and finally, an arithmetic average of the slopes of all the intermediate points is taken as a slope a of the landslide mass;

e. According to the distribution principle of topographic DEM data, all points in each grid are assigned with the same values, including coordinates and elevation, which are obtained through the grid;

f. A plane curvature Qp of each potential landslide mass intermediate point is calculated through a three-point method according to Formula 1, and then an arithmetic average is taken to obtain a plane curvature Q of a potential landslide mass;

$$Qp = 2\sin A/a \quad \text{Formula 1}$$

$$A = \arccos[(b^2+c^2-a^2)/(2bc)] \quad \text{Formula 2}$$

$$a = \sqrt{(x_1-x_2)^2+(y_1-y_2)^2} \quad \text{Formula 3}$$

$$b = \sqrt{(x_1-x_3)^2+(y_1-y_3)^2} \quad \text{Formula 4}$$

$$c = \sqrt{(x_3-x_2)^2+(y_3-y_2)^2} \quad \text{Formula 5}$$

Where Qp is the plane curvature of the potential landslide mass intermediate point, $x_1$, $x_2$ and $x_3$ are projected X coordinates of the first group of points 1, 2 and 3 in turn, $x_1=0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are the elevations of points 1, 2 and 3 respectively;

$$x_2 = \sqrt{(Xa-Xb)^2+(Ya-Yb)^2} \quad \text{Formula 6}$$

$$\sqrt{x_3 = (Xa-Xc)^2+(Ya-Yc)^2} \quad \text{Formula 7}$$

Where Xa and Ya are X and Y coordinates of point 1 in turn; Xb and Yb are X and Y coordinates of point 2 in turn; Xc and Yc are X and Y coordinates of point 3 in turn;

The plane curvatures Qp of the second to fifth groups of potential landslide mass intermediate points are calculated by Formula 1;

g. A topographic factor T of the potential landslide mass is calculated according to Formula 8;

$$T = \tan\alpha - 5Q \quad \text{Formula 8}$$

Where T is the topographic factor of the potential landslide mass, a is the slope of the landslide mass, and Q is the plane curvature of the potential landslide mass;

h. A rainfall factor R is calculated according to Formula 9;

$$R = (I/I_0)(D/D_0)^{0.82} \quad \text{Formula 9}$$

Where R is the rainfall factor, I is a hourly rainfall intensity, $I_0$ is an average value of years of local maximum annual hourly rainfalls and is determined by inquiring the local hydrological manual, D is a rainfall duration, and $D_0$ is a unit rainfall time, which is 1 hour;

i. An early warning determination value P of the shallow soil landslide is calculated according to Formula 10;

$$P = RT \quad \text{Formula 10}$$

Where P is the early warning determination value of the shallow soil landslide, R is the rainfall factor, and T is the topographic factor of the potential landslide mass;

j. Early warning is performed according to the early warning determination value P of the shallow soil landslide; when P<2.5, the possibility of landslide occurrence is low; when 2.5≤P<3.8, the possibility of landslide occurrence is medium; when P>3.8, the possibility of landslide occurrence is high.

This embodiment is the most basic implementation manner. By comprehensively considering the relationship between DEM scales and landslide scales, the influence factors of slope and cross-sectional depression of a landslide mass and an action mechanism in the landslide, an early warning calculation model for a shallow soil landslide based on a digital topographic map is built, so that the shallow soil landslide can be accurately determined and identified in a quantitative way, the shallow soil landslide can be early warned without a lot of historical observation data of landslide occurrence, and the dangerous landslide mass can be determined in advance, which greatly improves the applicability of disaster prevention and the early warning efficiency.

Embodiment 2

An early warning method for a shallow soil landslide based on a digital topographic map includes the following steps:

a. A slope with a depressed cross section is determined through topographic DEM data according to contour lines of the topographic map, then boundaries of both sides outside the landslide are determined from straight segments or downward bulged segments on both sides, and a straight line is connected at an intermediate position of a landslide mass perpendicular to a bottom boundary upward along an upward bulged intermediate point of each contour line of the topographic map as an intermediate line;

b. An intermediate point is determined on the intermediate line of the intermediate position of each grid line from the bottom intermediate line up, the spacing between the intermediate points being a DEM point spacing;

c. A bottom parallel line is drawn perpendicular to the intermediate line across the intermediate point to intersect the outer boundary of the landslide, the intersection points of two boundaries being outer boundary points, which together with the intermediate point on the same line constitute a three-point group of a plane curvature Qp of a potential landslide mass intermediate point;

d. A slope of each intermediate point is calculated by arcgis according to the position of each intermediate point and grid data, and finally, an arithmetic average of the slopes of all the intermediate points is taken as a slope α of the landslide mass;

e. According to the distribution principle of topographic DEM data, all points in each grid are assigned with the same values, including coordinates and elevation, which are obtained through the grid;

f. A plane curvature Qp of each potential landslide mass intermediate point is calculated through a three-point method according to Formula 1, and then an arithmetic average is taken to obtain a plane curvature Q of a potential landslide mass;

$$Qp=2\sin A/a \quad \text{Formula 1}$$

$$A=\arccos[(b^2+c^2-a^2)/(2bc)] \quad \text{Formula 2}$$

$$a=\sqrt{(x_1-x_2)^2+(y_1-y_2)^2} \quad \text{Formula 3}$$

$$b=\sqrt{(x_1-x_3)^2+(y_1-y_3)^2} \quad \text{Formula 4}$$

$$c=\sqrt{(x_3-x_2)^2+(y_3-y_2)^2} \quad \text{Formula 5}$$

Where Qp is the plane curvature of the potential landslide mass intermediate point, $x_1$, $x_2$ and $x_3$ are projected X coordinates of the first group of points 1, 2 and 3 in turn, $x_1=0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are the elevations of points 1, 2 and 3 respectively;

$$x_2=\sqrt{(Xa-Xb)^2+(Ya-Yb)^2} \quad \text{Formula 6}$$

$$\sqrt{x_3=(Xa-Xc)^2+(Ya-Yc)^2} \quad \text{Formula 7}$$

Where Xa and Ya are X and Y coordinates of point 1 in turn; Xb and Yb are X and Y coordinates of point 2 in turn; Xc and Yc are X and Y coordinates of point 3 in turn;

The plane curvatures Qp of the second to fifth groups of potential landslide mass intermediate points are calculated by Formula 1;

g. A topographic factor T of the potential landslide mass is calculated according to Formula 8;

$$T=\tan\alpha-5Q \quad \text{Formula 8}$$

Where T is the topographic factor of the potential landslide mass, α is the slope of the landslide mass, and Q is the plane curvature of the potential landslide mass;

h. A rainfall factor R is calculated according to Formula 9;

$$R=(I/I_0)(D/D_0)^{0.82} \quad \text{Formula 9}$$

Where R is the rainfall factor, I is a hourly rainfall intensity, $I_0$ is an average value of years of local maximum annual hourly rainfalls and is determined by inquiring the local hydrological manual, D is a rainfall duration, and $D_0$ is a unit rainfall time, which is 1 hour;

i. An early warning determination value P of the shallow soil landslide is calculated according to Formula 10;

$$P=RT \quad \text{Formula 10}$$

Where P is the early warning determination value of the shallow soil landslide, R is the rainfall factor, and T is the topographic factor of the potential landslide mass;

j. Early warning is performed according to the early warning determination value P of the shallow soil landslide; when P<2.5, the possibility of landslide occurrence is low; when 2.5≤P<3.8, the possibility of landslide occurrence is medium; when P>3.8, the possibility of landslide occurrence is high.

In step f, taking the arithmetic average refers to that a positive or negative sign of the plane curvature Qp of the potential landslide mass intermediate point is calculated first according to Formula 11 and Formula 12;

$$\text{If } y_2-kx_2-y_1>0 \quad \text{Formula 11}$$

The plane curvature Qp of the potential landslide mass intermediate point is positive, indicating a bulged topography;

$$\text{If } y_2-kx_2-y_1<0 \quad \text{Formula 12}$$

The plane curvature Qp of the potential landslide mass intermediate point is negative, indicating a depressed topography;

Where k is a coefficient, calculated by Formula 13;

$$k=(y_3-y_1)/x_3 \quad \text{Formula 13}$$

Then the calculated positive or negative sign of the plane curvature Qp of the potential landslide mass intermediate point is brought into the plane curvature Qp of the potential landslide mass intermediate point, and finally, arithmetic averaging is performed on the plane curvatures Qp of all groups of potential landslide mass intermediate points.

This embodiment is a preferred implementation manner. The plane curvature of a potential landslide mass is calculated not only by DEM data and a unified default method, but also by a three-point method, which avoids huge errors caused by DEM data intervals and landslide scale differences. The conventional default method calculates the plane curvature of a potential landslide mass by means of a specific DEM point, as well as 8 points in upper (1), lower (1), left (1), right (1) and oblique directions (4), totaling 9 points, where the calculated plane curvature is related to the grid scale and range where the 9 points are located. However, if the scale of the potential landslide mass is quite different from the grid scale of this DEM, the plane curvature cannot reflect the plane curvature of the potential landslide mass; if the scale of the potential landslide mass is much larger than the grid scale of the DEM, for example, the width of the landslide mass is 50 in and the DEM is 20 in, the calculated plane curvature is a part of the plane curvature of the potential landslide mass, and even if multiple plane curvatures on the landslide mass are averaged, it cannot represent the depressed or bulged characteristics of the whole potential landslide mass; if the scale of the potential landslide mass is much smaller than the grid scale of the DEM, for example, the width of the landslide mass is 5 in and the DEM is 20 in, the calculated plane curvature is a plane curvature in an area outside the outer boundary of the potential landslide mass, and cannot represent the depressed or bulged characteristics of the whole potential landslide mass. The present invention overcomes the conventional curvature calculation problems by organically combining a three-point method, and the calculated plane curvature can reflect the true depressed or bulged characteristics of the potential landslide mass.

Embodiment 3

An early warning method for a shallow soil landslide based on a digital topographic map includes the following steps:

a. A slope with a depressed cross section is determined through topographic DEM data according to contour lines of the topographic map, then boundaries of both sides outside the landslide are determined from straight segments or downward bulged segments on both sides, and a straight line is connected at an intermediate position of a landslide mass perpendicular to a bottom boundary upward along an upward bulged intermediate point of each contour line of the topographic map as an intermediate line;

b. An intermediate point is determined on the intermediate line of the intermediate position of each grid line from the bottom intermediate line up, the spacing between the intermediate points being a DEM point spacing;

c. A bottom parallel line is drawn perpendicular to the intermediate line across the intermediate point to intersect the outer boundary of the landslide, the intersection points of two boundaries being outer boundary points, which together with the intermediate point on the same line constitute a three-point group of a plane curvature Qp of a potential landslide mass intermediate point;

d. A slope of each intermediate point is calculated by arcgis according to the position of each intermediate point and grid data, and finally, an arithmetic average of the slopes of all the intermediate points is taken as a slope $\alpha$ of the landslide mass;

e. According to the distribution principle of topographic DEM data, all points in each grid are assigned with the same values, including coordinates and elevation, which are obtained through the grid;

f. A plane curvature Qp of each potential landslide mass intermediate point is calculated through a three-point method according to Formula 1, and then an arithmetic average is taken to obtain a plane curvature Q of a potential landslide mass;

$$Qp = 2\sin A/a \qquad \text{Formula 1}$$

$$A = \arccos[(b^2 + c^2 - a^2)/(2bc)] \qquad \text{Formula 2}$$

$$a = \sqrt{(x_1 - x_2)^2 + (y_1 - y_2)^2} \qquad \text{Formula 3}$$

$$b = \sqrt{(x_1 - x_3)^2 + (y_1 - y_3)^2} \qquad \text{Formula 4}$$

$$c = \sqrt{(x_3 - x_2)^2 + (y_3 - y_2)^2} \qquad \text{Formula 5}$$

Where Qp is the plane curvature of the potential landslide mass intermediate point, $x_1$, $x_2$ and $x_3$ are projected X coordinates of the first group of points 1, 2 and 3 in turn, $x_1 = 0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are the elevations of points 1, 2 and 3 respectively;

$$x_2 = \sqrt{(Xa - Xb)^2 + (Ya - Yb)^2} \qquad \text{Formula 6}$$

$$\sqrt{x_3 = (Xa - Xc)^2 + (Ya - Yc)^2} \qquad \text{Formula 7}$$

Where Xa and Ya are X and Y coordinates of point 1 in turn; Xb and Yb are X and Y coordinates of point 2 in turn; Xc and Yc are X and Y coordinates of point 3 in turn;

The plane curvatures Qp of the second to fifth groups of potential landslide mass intermediate points are calculated by Formula 1;

g. A topographic factor T of the potential landslide mass is calculated according to Formula 8;

$$T = \tan\alpha - 5Q \qquad \text{Formula 8}$$

Where T is the topographic factor of the potential landslide mass, $\alpha$ is the slope of the landslide mass, and Q is the plane curvature of the potential landslide mass;

h. A rainfall factor R is calculated according to Formula 9;

$$R = (I/I_0)(D/D_0)^{0.82} \qquad \text{Formula 9}$$

Where R is the rainfall factor, I is a hourly rainfall intensity, $I_0$ is an average value of years of local maximum annual hourly rainfalls and is determined by inquiring the local hydrological manual, D is a rainfall duration, and $D_0$ is a unit rainfall time, which is 1 hour;

i. An early warning determination value P of the shallow soil landslide is calculated according to Formula 10;

$$P = RT \qquad \text{Formula 10}$$

Where P is the early warning determination value of the shallow soil landslide, R is the rainfall factor, and T is the topographic factor of the potential landslide mass;

j. Early warning is performed according to the early warning determination value P of the shallow soil landslide; when P<2.5, the possibility of landslide occurrence is low; when 2.5≤P<3.8, the possibility of landslide occurrence is medium; when P>3.8, the possibility of landslide occurrence is high.

In step f, taking the arithmetic average refers to that a positive or negative sign of the plane curvature Qp of the potential landslide mass intermediate point is calculated first according to Formula 11 and Formula 12;

$$\text{If } y_2 - kx_2 - y_1 > 0 \qquad \text{Formula 11}$$

The plane curvature Qp of the potential landslide mass intermediate point is positive, indicating a bulged topography;

$$\text{If } y_2 - kx_2 - y_1 < 0 \qquad \text{Formula 12}$$

The plane curvature Qp of the potential landslide mass intermediate point is negative, indicating a depressed topography;

Where k is a coefficient, calculated by Formula 13;

$$k = (y_3 - y_1)/x_3 \qquad \text{Formula 13}$$

Then the calculated positive or negative sign of the plane curvature Qp of the potential landslide mass intermediate point is brought into the plane curvature Qp of the potential landslide mass intermediate point, and finally, arithmetic averaging is performed on the plane curvatures Qp of all groups of potential landslide mass intermediate points.

In step a, the slope with a depressed cross section indicates that the contour lines of the topographic map are bulged upward when viewed from the bottom.

In step a, the boundary refers to a downward bulged vertex or a starting position of a straight segment.

In step c, the same line refers to the bottom parallel line.

This embodiment is another preferred implementation manner. A three-point method is used to calculate the plane curvature of the potential landslide mass, so that the calculated plane curvature is more in line with the actual plane curvature of the landslide mass, and the calculation result is more accurate and reasonable, thus making the early warning of the potential landslide mass more accurate.

Embodiment 4

An early warning method for a shallow soil landslide based on a digital topographic map includes the following steps:

a. A slope with a depressed cross section is determined through topographic DEM data according to contour lines of the topographic map, then boundaries of both sides outside the landslide are determined from straight segments or downward bulged segments on both sides, and a straight line is connected at an intermediate position of a landslide mass perpendicular to a bottom boundary upward along an upward bulged intermediate point of each contour line of the topographic map as an intermediate line;

b. An intermediate point is determined on the intermediate line of the intermediate position of each grid line from the bottom intermediate line up, the spacing between the intermediate points being a DEM point spacing;

c. A bottom parallel line is drawn perpendicular to the intermediate line across the intermediate point to intersect the outer boundary of the landslide, the intersection points of two boundaries being outer boundary points, which together with the intermediate point on the same line constitute a three-point group of a plane curvature Qp of a potential landslide mass intermediate point;

d. A slope of each intermediate point is calculated by arcgis according to the position of each intermediate point and grid data, and finally, an arithmetic average of the slopes of all the intermediate points is taken as a slope $\alpha$ of the landslide mass;

e. According to the distribution principle of topographic DEM data, all points in each grid are assigned with the same values, including coordinates and elevation, which are obtained through the grid;

f. A plane curvature Qp of each potential landslide mass intermediate point is calculated through a three-point method according to Formula 1, and then an arithmetic average is taken to obtain a plane curvature Q of a potential landslide mass;

$$Qp = 2\sin A/a \qquad \text{Formula 1}$$

$$A = \arccos[(b^2 + c^2 - a^2)/(2bc)] \qquad \text{Formula 2}$$

$$a = \sqrt{(x_1 - x_2)^2 + (y_1 - y_2)^2} \qquad \text{Formula 3}$$

$$b = \sqrt{(x_1 - x_3)^2 + (y_1 - y_3)^2} \qquad \text{Formula 4}$$

$$c = \sqrt{(x_3 - x_2)^2 + (y_3 - y_2)^2} \qquad \text{Formula 5}$$

Where Qp is the plane curvature of the potential landslide mass intermediate point, $x_1$, $x_2$ and $x_3$ are projected X coordinates of the first group of points 1, 2 and 3 in turn, $x_1 = 0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are the elevations of points 1, 2 and 3 respectively;

$$x_2 = \sqrt{(Xa - Xb)^2 + (Ya - Yb)^2} \qquad \text{Formula 6}$$

$$\sqrt{x_3 = (Xa - Xc)^2 + (Ya - Yc)^2} \qquad \text{Formula 7}$$

Where Xa and Ya are X and Y coordinates of point 1 in turn; Xb and Yb are X and Y coordinates of point 2 in turn; Xc and Yc are X and Y coordinates of point 3 in turn;

The plane curvatures Qp of the second to fifth groups of potential landslide mass intermediate points are calculated by Formula 1;

g. A topographic factor T of the potential landslide mass is calculated according to Formula 8;

$$T = \tan\alpha - 5Q \qquad \text{Formula 8}$$

Where T is the topographic factor of the potential landslide mass, $\alpha$ is the slope of the landslide mass, and Q is the plane curvature of the potential landslide mass;

h. A rainfall factor R is calculated according to Formula 9;

$$R = (I/I_0)(D/D_0)^{0.82} \qquad \text{Formula 9}$$

Where R is the rainfall factor, I is a hourly rainfall intensity, $I_0$ is an average value of years of local maximum annual hourly rainfalls and is determined by inquiring the local hydrological manual, D is a rainfall duration, and $D_0$ is a unit rainfall time, which is 1 hour;

i. An early warning determination value P of the shallow soil landslide is calculated according to Formula 10;

$$P = RT \qquad \text{Formula 10}$$

Where P is the early warning determination value of the shallow soil landslide, R is the rainfall factor, and T is the topographic factor of the potential landslide mass;

j. Early warning is performed according to the early warning determination value P of the shallow soil landslide; when P<2.5, the possibility of landslide occurrence is low; when 2.5≤P<3.8, the possibility of landslide occurrence is medium; when P>3.8, the possibility of landslide occurrence is high.

In step f, taking the arithmetic average refers to that a positive or negative sign of the plane curvature Qp of the potential landslide mass intermediate point is calculated first according to Formula 11 and Formula 12;

$$\text{If } y_2 - kx_2 - y_1 > 0 \qquad \text{Formula 11}$$

The plane curvature Qp of the potential landslide mass intermediate point is positive, indicating a bulged topography;

$$\text{If } y_2 - kx_2 - y_1 < 0 \qquad \text{Formula 12}$$

The plane curvature Qp of the potential landslide mass intermediate point is negative, indicating a depressed topography;

Where k is a coefficient, calculated by Formula 13;

$$k = (y_3 - y_1)/x_3 \qquad \text{Formula 13}$$

Then the calculated positive or negative sign of the plane curvature Qp of the potential landslide mass intermediate point is brought into the plane curvature Qp of the potential landslide mass intermediate point, and finally, arithmetic averaging is performed on the plane curvatures Qp of all groups of potential landslide mass intermediate points.

In step a, the slope with a depressed cross section indicates that the contour lines of the topographic map are bulged upward when viewed from the bottom.

In step a, the boundary refers to a downward bulged vertex or a starting position of a straight segment.

In step c, the same line refers to the bottom parallel line.

This method is applicable to the early warning of a shallow soil landslide with a slope of 15≤$\alpha$≤50°.

This embodiment is yet another preferred implementation manner. The range of a potential landslide mass is determined by means of DEM topographic data and the contour lines of a topographic map, and important DEM points and each group of data points are determined within this range. According to each group of data points with three points on one line as a group, the slope $\alpha$ of the landslide mass and the plane curvature Qp of each potential landslide mass intermediate point are calculated; then the topographic factor T of the landslide mass is calculated; finally, the shallow soil landslide is early warned according to the slope $\alpha$ of the landslide mass, the plane curvature Qp of each potential landslide mass intermediate point and the topographic factor T; the degree of landslide occurrence is studied from the internal mechanism by means of topographic factors, and the slope and cross-sectional topographic conditions of the landslide mass are completely combined to comprehensively consider the effect of topographic factors and reflect the mutual relation and importance of various influence factors; T, tan(α) and Q are all dimensionless parameters and can be used under various shallow soil landslide conditions, which greatly improves the applicability of disaster prevention.

When P<2.5, the possibility of landslide occurrence is low; when 2.5≤P<3.8, the possibility of landslide occurrence is medium; when P≥3.8, the possibility of landslide occurrence is high. Only under enough terrain conditions and rainfall conditions, the early warning determination value P of the shallow soil landslide can early warn the occurrence of a landslide. In addition, the greater the P value is, the higher the possibility of landslide occurrence is; otherwise, the smaller the P value is, the lower the possibility of landslide occurrence is. The early warning of a landslide is intuitive and clear, which is more conducive to improving the applicability of disaster prevention.

The present invention is applicable to the early warning of a shallow soil landslide with a slope of 15≤α≤50°. The magnitude of the slope not only affects the accumulation and distribution of loose clastic matters, but also affects the confluence condition of a slope surface. If the slope is too gentle, the landslide is underpowered; if the slope is too steep, the soil layer cannot gather enough thickness on the slope surface; and when the slope of the landslide mass is 15≤α≤50°, the early warning accuracy of the shallow soil landslide is high, and prevention and control measures can be taken in time.

Embodiment 5

An early warning method for a shallow soil landslide based on a digital topographic map includes the following steps:

a. A slope with a depressed cross section is determined through topographic DEM data according to contour lines of the topographic map, then boundaries of both sides outside the landslide are determined from straight segments or downward bulged segments on both sides, and a straight line is connected at an intermediate position of a landslide mass perpendicular to a bottom boundary upward along an upward bulged intermediate point of each contour line of the topographic map as an intermediate line;

b. An intermediate point is determined on the intermediate line of the intermediate position of each grid line from the bottom intermediate line up, the spacing between the intermediate points being a DEM point spacing;

c. A bottom parallel line is drawn perpendicular to the intermediate line across the intermediate point to intersect the outer boundary of the landslide, the intersection points of two boundaries being outer boundary points, which together with the intermediate point on the same line constitute a three-point group of a plane curvature Qp of a potential landslide mass intermediate point;

d. A slope of each intermediate point is calculated by arcgis according to the position of each intermediate point and grid data, and finally, an arithmetic average of the slopes of all the intermediate points is taken as a slope α of the landslide mass;

e. According to the distribution principle of topographic DEM data, all points in each grid are assigned with the same values, including coordinates and elevation, which are obtained through the grid;

f. A plane curvature Qp of each potential landslide mass intermediate point is calculated through a three-point method according to Formula 1, and then an arithmetic average is taken to obtain a plane curvature Q of a potential landslide mass;

$$Qp = 2\sin A/a \quad \text{Formula 1}$$

$$A = \arccos[(b^2+c^2-a^2)/(2bc)] \quad \text{Formula 2}$$

$$a = \sqrt{(x_1-x_2)^2+(y_1-y_2)^2} \quad \text{Formula 3}$$

$$b = \sqrt{(x_1-x_3)^2+(y_1-y_3)^2} \quad \text{Formula 4}$$

$$c = \sqrt{(x_3-x_2)^2+(y_3-y_2)^2} \quad \text{Formula 5}$$

Where Qp is the plane curvature of the potential landslide mass intermediate point, $x_1$, $x_2$ and $x_3$ are projected X coordinates of the first group of points 1, 2 and 3 in turn, $x_1=0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are the elevations of points 1, 2 and 3 respectively;

$$x_2 = \sqrt{(Xa-Xb)^2+(Ya-Yb)^2} \quad \text{Formula 6}$$

$$\sqrt{x_3=(Xa-Xc)^2+(Ya-Yc)^2} \quad \text{Formula 7}$$

Where Xa and Ya are X and Y coordinates of point 1 in turn; Xb and Yb are X and Y coordinates of point 2 in turn; Xc and Yc are X and Y coordinates of point 3 in turn;

The plane curvatures Qp of the second to fifth groups of potential landslide mass intermediate points are calculated by Formula 1;

g. A topographic factor T of the potential landslide mass is calculated according to Formula 8;

$$T = \tan\alpha - 5Q \quad \text{Formula 8}$$

Where T is the topographic factor of the potential landslide mass, α is the slope of the landslide mass, and Q is the plane curvature of the potential landslide mass;

h. A rainfall factor R is calculated according to Formula 9;

$$R = (I/I_0)(D/D_0)^{0.82} \quad \text{Formula 9}$$

Where R is the rainfall factor, I is a hourly rainfall intensity, $I_0$ is an average value of years of local maximum annual hourly rainfalls and is determined by inquiring the local hydrological manual, D is a rainfall duration, and $D_0$ is a unit rainfall time, which is 1 hour;

i. An early warning determination value P of the shallow soil landslide is calculated according to Formula 10;

$$P = RT \quad \text{Formula 10}$$

Where P is the early warning determination value of the shallow soil landslide, R is the rainfall factor, and T is the topographic factor of the potential landslide mass;

j. Early warning is performed according to the early warning determination value P of the shallow soil landslide; when P<2.5, the possibility of landslide occurrence is low; when 2.5≤P<3.8, the possibility of landslide occurrence is medium; when P>3.8, the possibility of landslide occurrence is high.

In step f, taking the arithmetic average refers to that a positive or negative sign of the plane curvature Qp of the potential landslide mass intermediate point is calculated first according to Formula 11 and Formula 12;

If $y_2-kx_2-y_1>0$　　　　　　　　　　　　　　　　　Formula 11

The plane curvature Qp of the potential landslide mass intermediate point is positive, indicating a bulged topography;

If $y_2-kx_2-y_1<0$　　　　　　　　　　　　　　　　　Formula 12

The plane curvature Qp of the potential landslide mass intermediate point is negative, indicating a depressed topography;

Where k is a coefficient, calculated by Formula 13;

$k=(y_3-y_1)/x_3$　　　　　　　　　　　　　　　　　Formula 13

Then the calculated positive or negative sign of the plane curvature Qp of the potential landslide mass intermediate point is brought into the plane curvature Qp of the potential landslide mass intermediate point, and finally, arithmetic averaging is performed on the plane curvatures Qp of all groups of potential landslide mass intermediate points.

In step a, the slope with a depressed cross section indicates that the contour lines of the topographic map are bulged upward when viewed from the bottom.

In step a, the boundary refers to a downward bulged vertex or a starting position of a straight segment.

In step c, the same line refers to the bottom parallel line.

This method is applicable to the early warning of a shallow soil landslide with a slope of $15\leq\alpha\leq50°$.

This method is applicable to the early warning of a shallow soil landslide with a depressed or straight slope cross section.

This method is applicable to the early warning of a shallow soil landslide with a thickness of 2-10 m.

This embodiment is the best implementation manner. The present invention is applicable to the early warning of a shallow soil landslide with a depressed or straight slope cross section. When the cross section is bulged, the water flow disperses to both sides and does not seep into the landslide mass, so a landslide will not be formed; and when the cross section of the slope is depressed or straight, especially the depressed topography, rainfall can be collected, which is more conducive to the occurrence of a landslide. When the cross section of the slope is depressed or straight, the early warning accuracy of the shallow soil landslide is extremely high, and the applicability for disaster prevention is strong.

The present invention is applicable to the early warning of a shallow soil landslide with a thickness of 2-10 m. When the soil layer is too thin, the water body is likely to enter the landslide mass and reach the sliding surface, so the effect and influence of depressions and bulges in the cross section are greater, the resistance on both sides is smaller, and the depressions have a greater influence under the comprehensive action. When the soil layer is too thick, the water body is unlikely to enter the landslide mass and reach the sliding surface, so the effect and influence of depressions and bulges in the cross section are smaller, the resistance on both sides is greater, and the depressions have a smaller influence under the comprehensive action. The cross section is affected by the depressed topography, which differs due to the different thicknesses of the soil layer. Therefore, the present invention has extremely high early warning accuracy for a shallow soil landslide and strong applicability for disaster prevention.

Shallow soil landslides in Guizhou Province are analyzed below by using the present invention:

Sinan County and Yinjiang County are located in the northwest of Guizhou Province. In July 2014, the two counties suffered from rare continuous heavy rainfalls, which induced some shallow soil landslides.

As shown in Table 1, landslides occurred at 11 of the 26 potential landslide masses in July 2014.

Table 1 shows the topographic parameters and early warning discrimination of 26 potential landslide masses investigated in Sinan County and Yinjiang County of Guizhou Province.

TABLE 1

| Serial number | α (°) | tan (α) | Q | T | R | P | Possibility of landslide | Whether a landslide occurs |
|---|---|---|---|---|---|---|---|---|
| 1 | 31.5 | 0.613 | −0.0377 | 0.802 | 3.24 | 2.60 | Medium | Yes |
| 2 | 20.9 | 0.381 | −0.0398 | 0.580 | 3.24 | 1.88 | Low | No |
| 3 | 28.9 | 0.552 | −0.0325 | 0.715 | 3.24 | 2.31 | Low | No |
| 4 | 28.8 | 0.550 | −0.0405 | 0.753 | 3.24 | 2.44 | Low | No |
| 5 | 40.0 | 0.838 | −0.00263 | 0.851 | 4.87 | 4.15 | High | Yes |
| 6 | 50.0 | 1.190 | −0.0002 | 1.191 | 4.87 | 5.36 | High | Yes |
| 7 | 31.1 | 0.603 | −0.0298 | 0.752 | 4.87 | 3.66 | Medium | No |
| 8 | 22.0 | 0.405 | −0.0208 | 0.509 | 4.87 | 2.48 | Low | No |
| 9 | 20.0 | 0.364 | −0.0227 | 0.478 | 4.87 | 2.33 | Low | No |
| 10 | 23.5 | 0.435 | −0.0287 | 0.579 | 4.87 | 2.82 | Medium | No |
| 11 | 34.1 | 0.676 | −0.0183 | 0.767 | 3.92 | 3.01 | Medium | Yes |
| 12 | 48.3 | 1.124 | −0.0331 | 1.29 | 3.92 | 5.05 | High | Yes |
| 13 | 40.1 | 0.842 | −0.00015 | 0.843 | 3.92 | 3.01 | Medium | Yes |
| 14 | 43.2 | 0.939 | −0.0309 | 1.094 | 3.92 | 4.29 | High | Yes |
| 15 | 39.3 | 0.818 | −0.0310 | 0.973 | 3.92 | 3.81 | High | Yes |
| 16 | 42.3 | 0.910 | −0.0008 | 0.914 | 3.92 | 3.55 | Medium | Yes |
| 17 | 39.2 | 0.816 | 0.0011 | 0.811 | 3.92 | 3.12 | Medium | No |
| 18 | 30.3 | 0.484 | −0.0368 | 0.768 | 3.92 | 3.01 | Medium | No |
| 19 | 19.6 | 0.356 | −0.0242 | 0.477 | 3.92 | 1.87 | Low | No |
| 20 | 41.5 | 0.885 | −0.0267 | 1.02 | 3.92 | 3.99 | High | Yes |
| 21 | 24.9 | 0.464 | −0.0341 | 0.635 | 3.92 | 2.49 | Low | No |
| 22 | 31.5 | 0.613 | −0.0302 | 0.764 | 3.92 | 2.99 | Medium | No |
| 23 | 27.4 | 0.518 | −0.0414 | 0.725 | 3.92 | 2.84 | Medium | No |
| 24 | 45.6 | 1.02 | −0.0424 | 1.232 | 3.92 | 4.83 | High | Yes |
| 25 | 24.4 | 0.454 | −0.0424 | 0.666 | 3.92 | 2.61 | Medium | No |
| 26 | 37.7 | 0.773 | −0.0375 | 0.961 | 3.92 | 3.77 | Medium | No |

The calculation results of the early warning determination values P of shallow soil landslides in Table 1 show that, among the 26 potential landslide masses, there are 7 points with high possibilities of being early warned and determined as landslides, 12 points with medium possibilities of being early warned and determined as landslides, and 7 points with low possibilities of being early warned and determined as landslides.

With reference to the actual situations, landslides occurred in July 2014 at all the 7 points with high possibilities of being early warned and determined as landslides; landslides occurred in July 2014 at 4 of the 12 points with medium possibilities of being early warned and determined as landslides, and landslides did not occur at the remaining 8 paints; and no landslide occurred in July 2014 at all the 7 points with low possibilities of being early warned and determined as landslides.

To sum up, the method of the present invention has high early warning accuracy for shallow soil landslides.

The invention claimed is:

1. An early warning method for a shallow soil landslide based on a digital topographic map, characterized by comprising the following steps:
   a. determining a slope with a depressed cross section through topographic DEM data according to contour lines of the topographic map, then determining boundaries of both sides outside the landslide from straight segments or downward bulged segments on both sides, and connecting a straight line at an intermediate position of a landslide mass perpendicular to a bottom boundary upward along an upward bulged intermediate point of each contour line of the topographic map as an intermediate line;
   b. determining an intermediate point on the intermediate line of the intermediate position of each grid line from the bottom intermediate line up, the spacing between the intermediate points being a DEM point spacing;
   c. drawing a bottom parallel line perpendicular to the intermediate line across the intermediate point to intersect the outer boundary of the landslide, the intersection points of two boundaries being outer boundary points, which together with the intermediate point on the same line constitute a three-point group of a plane curvature Qp of a potential landslide mass intermediate point;
   d. calculating a slope of each intermediate point by arcgis according to the position of each intermediate point and grid data, and finally, taking an arithmetic average of the slopes of all the intermediate points as a slope a of the landslide mass;
   e. assigning, according to the distribution principle of topographic DEM data, all points in each grid with the same values, including coordinates and elevation, which are obtained through the grid;
   f. calculating a plane curvature Qp of each potential landslide mass intermediate point through a three-point method according to Formula 1, and then taking an arithmetic average to obtain a plane curvature Q of a potential landslide mass;

$$Qp = 2\sin A/a \quad \text{Formula 1}$$

$$A = \arccos[(b^2 + c^2 - a^2)/(2bc)] \quad \text{Formula 2}$$

$$a = \sqrt{(x_1-x_2)^2 + (y_1-y_2)^2} \quad \text{Formula 3}$$

$$b = \sqrt{(x_1-x_3)^2 + (y_1-y_3)^2} \quad \text{Formula 4}$$

$$c = \sqrt{(x_3-x_2)^2 + (y_3-y_2)^2} \quad \text{Formula 5}$$

where Qp is the plane curvature of the potential landslide mass intermediate point, $x_1$, $x_2$ and $x_3$ are projected X coordinates of the first group of points 1, 2 and 3 in turn, $x_1=0$, and $x_2$ is a linear distance between points 1 and 2 and is calculated by Formula 6; $x_3$ is a linear distance between points 1 and 3 and is calculated by Formula 7; $y_1$, $y_2$ and $y_3$ are the elevations of points 1, 2 and 3 respectively;

$$x_2 = \sqrt{(Xa-Xb)^2 + (Ya-Yb)^2} \quad \text{Formula 6}$$

$$\sqrt{x_3 = (Xa-Xc)^2 + (Ya-Yc)^2} \quad \text{Formula 7}$$

where Xa and Ya are X and Y coordinates of point 1 in turn; Xb and Yb are X and Y coordinates of point 2 in turn; Xc and Yc are X and Y coordinates of point 3 in turn;

wherein the plane curvatures Qp of the second to fifth groups of potential landslide mass intermediate points are calculated by Formula 1;

g. calculating a topographic factor T of the potential landslide mass according to Formula 8;

$$T = \tan\alpha - 5Q \quad \text{Formula 8}$$

where T is the topographic factor of the potential landslide mass, a is the slope of the landslide mass, and Q is the plane curvature of the potential landslide mass;

h. calculating a rainfall factor R according to Formula 9;

$$R = (I/I_0)(D/D_0)^{0.82} \quad \text{Formula 9}$$

where R is the rainfall factor, I is a hourly rainfall intensity, $I_0$ is an average value of years of local maximum annual hourly rainfalls and is determined by inquiring the local hydrological manual, D is a rainfall duration, and $D_0$ is a unit rainfall time, which is 1 hour;

i. calculating an early warning determination value P of the shallow soil landslide according to Formula 10;

$$P = RT \quad \text{Formula 10}$$

where P is the early warning determination value of the shallow soil landslide, R is the rainfall factor, and T is the topographic factor of the potential landslide mass;

j. performing early warning according to the early warning determination value P of the shallow soil landslide, wherein when P<2.5, the possibility of landslide occurrence is low; when 2.5≤P<3.8, the possibility of landslide occurrence is medium; when P>3.8, the possibility of landslide occurrence is high.

2. The early warning method for a shallow soil landslide based on a digital topographic map according to claim 1, characterized in that in step f, taking the arithmetic average refers to calculating a positive or negative sign of the plane curvature Qp of the potential landslide mass intermediate point first according to Formula 11 and Formula 12;

$$\text{If } y_2 - kx_2 - y_1 > 0 \quad \text{Formula 11}$$

the plane curvature Qp of the potential landslide mass intermediate point is positive, indicating a bulged topography;

$$\text{If } y_2 - kx_2 - y_1 < 0 \quad \text{Formula 12}$$

the plane curvature Qp of the potential landslide mass intermediate point is negative, indicating a depressed topography;

where k is a coefficient, calculated by Formula 13;

$$k = (y_3 - y_1)/x_3 \quad \text{Formula 13}$$

then bringing the calculated positive or negative sign of the plane curvature Qp of the potential landslide mass intermediate point into the plane curvature Qp of the potential landslide mass intermediate point, and finally, performing arithmetic averaging on the plane curvatures Qp of all groups of potential landslide mass intermediate points.

3. The early warning method for a shallow soil landslide based on a digital topographic map according to claim 1, characterized in that in step a, the slope with a depressed cross section indicates that the contour lines of the topographic map are bulged upward when viewed from the bottom.

4. The early warning method for a shallow soil landslide based on a digital topographic map according to claim 1, characterized in that in step c, the same line refers to the bottom parallel line.

5. The early warning method for a shallow soil landslide based on a digital topographic map according to claim 1, characterized in that the method is applicable to the early warning of a shallow soil landslide with a slope of $15 \leq \alpha \leq 50°$.

6. The early warning method for a shallow soil landslide based on a digital topographic map according to claim 1, characterized in that the method is applicable to the early warning of a shallow soil landslide with a depressed or straight slope cross section.

7. The early warning method for a shallow soil landslide based on a digital topographic map according to claim 1, characterized in that the method is applicable to the early warning of a shallow soil landslide with a thickness of 2-10 m.

\* \* \* \* \*